United States Patent [19]

Buschbom et al.

[11] 4,329,105
[45] May 11, 1982

[54] SILO UNLOADER LEVELING APPARATUS

[75] Inventors: Floyd E. Buschbom, Long Lake; Glen D. Hansen, Maple Plain; Jerome T. Paulson, Long Lake; Clifton W. Anderson, Wayzata, all of Minn.

[73] Assignee: Veda, Inc., Long Lake, Minn.

[21] Appl. No.: 34,863

[22] Filed: Apr. 30, 1979

[51] Int. Cl.³ .............................................. B65G 65/38
[52] U.S. Cl. ................................. 414/316; 414/320; 406/114
[58] Field of Search .................. 414/316, 319–321; 222/404, 405; 280/43.17, 43.19, 43.2, 43.21, 43.23; 406/59, 114

[56] References Cited

U.S. PATENT DOCUMENTS

| | | |
|---|---|---|
| 2,651,438 | 9/1953 | Peterson . |
| 2,671,696 | 3/1954 | McLean . |
| 2,801,885 | 8/1957 | Harris . |
| 3,017,043 | 1/1962 | Buschbom . |
| 3,017,044 | 1/1962 | Englemann . |
| 3,090,506 | 5/1963 | Buschbom . |
| 3,338,636 | 8/1967 | Chapman et al. . |
| 3,462,199 | 8/1969 | Harris et al. . |
| 3,670,907 | 6/1972 | Downing et al. . |
| 3,896,942 | 7/1975 | Couture et al. . |
| 4,170,385 | 10/1979 | Buschbom et al. ............. 414/316 X |

Primary Examiner—Robert W. Saifer
Attorney, Agent, or Firm—Richard O. Bartz; L. Paul Burd; Robert W. Gutenkauf

[57] ABSTRACT

A top unloading silo unloader pendantly supported in a tower silo. The unloader has a material collector moved around the silo with drive structure. An impeller receives material from the collector and throws the material into an out chute which directs the material to a doorway leading to an upright passageway. The drive structure mounted on the outer end of the collector has leading and trailing drive wheels connected with movable mounts to a leveling apparatus. Power is applied to both wheels by separate drive shafts connected to the power transmission for the augers of the collector. The leveling apparatus has a base secured to the collector. Supports pivotally mounted on opposite ends of the base are attached to the mounts for the wheels. A linear actuator connected to the supports operates to concurrently pivot the supports in opposite directions so that the outer end of the collector can be raised or lowered and held in a selected position. A lost motion connector attaches the linear actuator to one support to allow the linear actuator to have limited contraction without raising the drive wheels. The linear actuator has a reversible electric motor coupled to a motor controller. A generally horizontal reference arm attached to a non-pivoting part of the unloader is linked to the controller so that movement of the collector up or down actuates the controller whereby the motor operates the linear actuator to increase its overall length to raise the outer end of the collector or to decrease its overall length to lower the outer end of the collector thereby maintaining the outer end of the collector at a selected position.

49 Claims, 14 Drawing Figures

SILO UNLOADER LEVELING APPARATUS

BACKGROUND OF INVENTION

Top unloading silo unloaders are used to remove a variety of feed materials from tower silos. These materials include silage and haylage ranging from hard binding material, padded and interlocked fibrous material, to loose light and soft material. During the cold season in northern geographic areas, the material adjacent the silo wall becomes a hard frozen mass. This hard frozen material is cut up and chipped from the silo wall with power-driven wall cleaners located on the wall end of the unloader. Different types and densities of material stored in tower silos make it difficult to efficiently remove the material from the silos.

Top unloading silo unloaders have the greatest material removing efficiency when they are operated in a generally horizontal level position and move around the silo wall at a constant or even speed. Under these operating conditions, the gathering and the flow of material through the unloader is uniform and at maximum capacity. Uneven material flow and large bunches of material reduce capacity of the unloader and can plug the unloader.

Large diameter tower silos, 20 to 30 feet, require large silo unloaders with long collectors. These collectors handle a large volume of material which must be evenly fed into the impeller. Maintaining the collector in a selected operating position, as a horizontally level position or at a slight angle and driving the collector around the silo wall at an even speed is desirable to insure even feeding of the material so that a high volume of material can be efficiently handled by the unloader.

Prior top unloading silo unloaders have the outer ends of the collectors in engagement with the top of the material when the unloader is not operating. These unloaders have high starting torque because they are started under partial load. In very cold conditions, top unloaders can freeze up if they are not cleared of material.

PRIOR ART:

The following U.S. patents show top unloading silo unloaders equipped with leveling and drive wheels.
U.S. Pat. No. 2,651,438: Peterson
U.S. Pat. No. 2,671,696: McLean
U.S. Pat. No. 2,801,885: Harris
U.S. Pat. No. 3,017,043: Buschbom
U.S. Pat. No. 3,017,044: Englemann
U.S. Pat. No. 3,090,506: Buschbom
U.S. Pat. No. 3,338,636: Chapman et al
U.S. Pat. No. 3,462,199: Harris et al
U.S. Pat. No. 3,670,907: Downing
U.S. Pat. No. 3,896,942: Couture et al.

SUMMARY OF INVENTION

The invention relates to a material handling machine operable to gather material stored in a first location and move the gathered material to a second location. More particularly, the invention is directed to a top unloading silo unloader having a material collector equipped with an automatic leveling apparatus having driving wheel means to move the collector around the silo. The material gathered by the collector is delivered to an impeller which throws the material into an out chute which directs the material to an open doorway in the silo wall. The impeller is pivotally connected to a slip ring assembly in a manner which allows the collector to move up and down relative to a reference position. A cable pendantly connected to the slip ring assembly supports the inner portion of the unloader from a structure, as a tripod, mounted on top of the silo wall. The leveling apparatus is rendered operable or non-operable by a control unit to maintain the outer end of the collector in a selected operating position. The operating position of the collector can be horizontal or inclined upward or downward from the center of the unloader. The control unit is connected to a fixed reference means which actuates the control unit in response to up and down movements of the outer end of the collector. Specifically, the leveling apparatus secured to the outer end of the collector has a first pivoted support connected to a first mount. A first wheel attached to the first mount is located adjacent the leading side of the collector. A second wheel attached to the second mount is located adjacent the trailing side of the collector. Each support has an upwardly directed arm connected to an extendible and contractable means, as a linear actuator or hydraulic piston and cylinder assembly.

A lost motion linkage connects one end of the linear actuator to an arm allowing the linear actuator to contract a limited amount without raising the drive wheels. When the collector augers engage hard material they tend to ride on top of the hard material. This causes the control unit to energize the motor to contract the linear actuator. The lost motion linkage functions to retain the drive wheels in traction engagement with the material so that the collector will continue to move around the silo wall and over the hard material.

The linear actuator has a reversible motor and movable members connected to the arms. The control unit mounted on the collector operates to keep the motor in its inoperative condition and control the operation of the motor to change the length of the actuator. When the length of the actuator is increased, the outer end of the collector is raised. When the length of the actuator is shortened, the outer end of the collector is lowered.

The reference means includes a reference arm mounted on the rotatable part of the slip ring assembly. The reference arm is held in a constant reference location as it moves in a circular path along with the collector. A link connects the reference arm to the control unit whereby up and down movement of the outer end of the collector relative to the reference arm operates the control unit to provide power to the reversible motor. When there is no up and down movement of the outer end of the collector relative to the reference arm, the control unit remains in its off condition. The control unit automatically functions to maintain the motor in its inoperative condition or to control the operation of the motor in either a forward or reverse direction as the collector moves around the silo wall.

DESCRIPTION OF PREFERRED EMBODIMENTS

Figure 1:
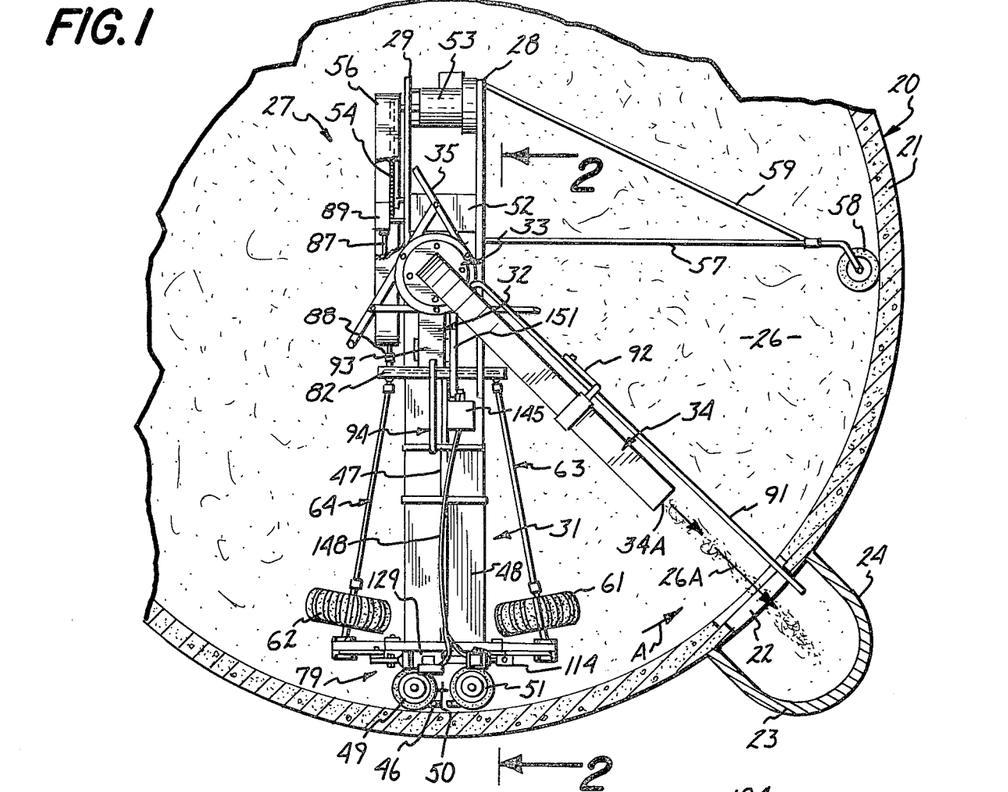
FIG. 1 is a top plan view of a top unloading silo unloader of the invention located in a tower silo.

Referring to FIG. 1, there is shown a cross section of a tower silo indicated generally at 20 having an upright cylindrical side wall 21. Wall 21 has a plurality of vertically aligned openings or doorways 22 providing access between the interior of silo 20 and an upright chute 23. Chute 23 is an upright generally U-shaped member located around an upright passage 24. Passage 24 is aligned with doorways 22 so that material moved through an open doorway 22 will fall to the base of silo 20. Conveyor structures may be used to move the material from the base of the silo to bunk feeders or vehicles for moving the material to feeding locations. Wall 21 forms an upright cylindrical chamber or material storage area for accommodating bulk feed materials 26, as silage, haylage, grains, and the like.

A top unloading silo unloader indicated generally at 27 operates to mechanically remove a top layer of feed material 26 and discharge the material through an open doorway 22 into the chute passage 24. Unloader 27 operates to continuously pick up or collect a top layer of feed material 26 and transport the material to discharge chute 23. The silo unloader 27 has a pair of longitudinal frame members 28 and 29, shown as tubular beams. Frame members 28 and 29 can be channel-shaped structures. Frame members 28 and 29 extend outwardly parallel to each other toward the wall 21 and form part of a material collector indicated generally at 31.

Collector 31 circumferentially moves around the surface of material 26 in a circular path in the direction of the arrow A. Collector 31 operates to dig up a top layer of material 26 and move the material to the center of the silo. An impeller indicated generally at 32 receives the material from collector 31 and throws the material through an out or discharge chute 34. An example of an impeller is disclosed by Hansen in U.S. Pat. No. 3,589,500. Other types of impellers can be used to move the material from the collector to the out chute. Out chute 34 has an outer end 34A spaced inwardly from and facing an open doorway 22 so that the material moving through chute 34 is directed at open doorway 22 and is moved into passage 24.

The inlet end of out chute 34 is pivotally mounted on a slip ring assembly indicated generally at 33. Slip ring assembly 33 has a non-rotatable part carrying a rotatable member. The non-rotatable part and rotatable member each have a central passageway or hole allowing the material moved by the impeller to flow into out chute 34. Examples of slip ring assemblies are shown in U.S. Pat. Nos. 3,517,369 and 3,594,680.

Figures 2, 10:
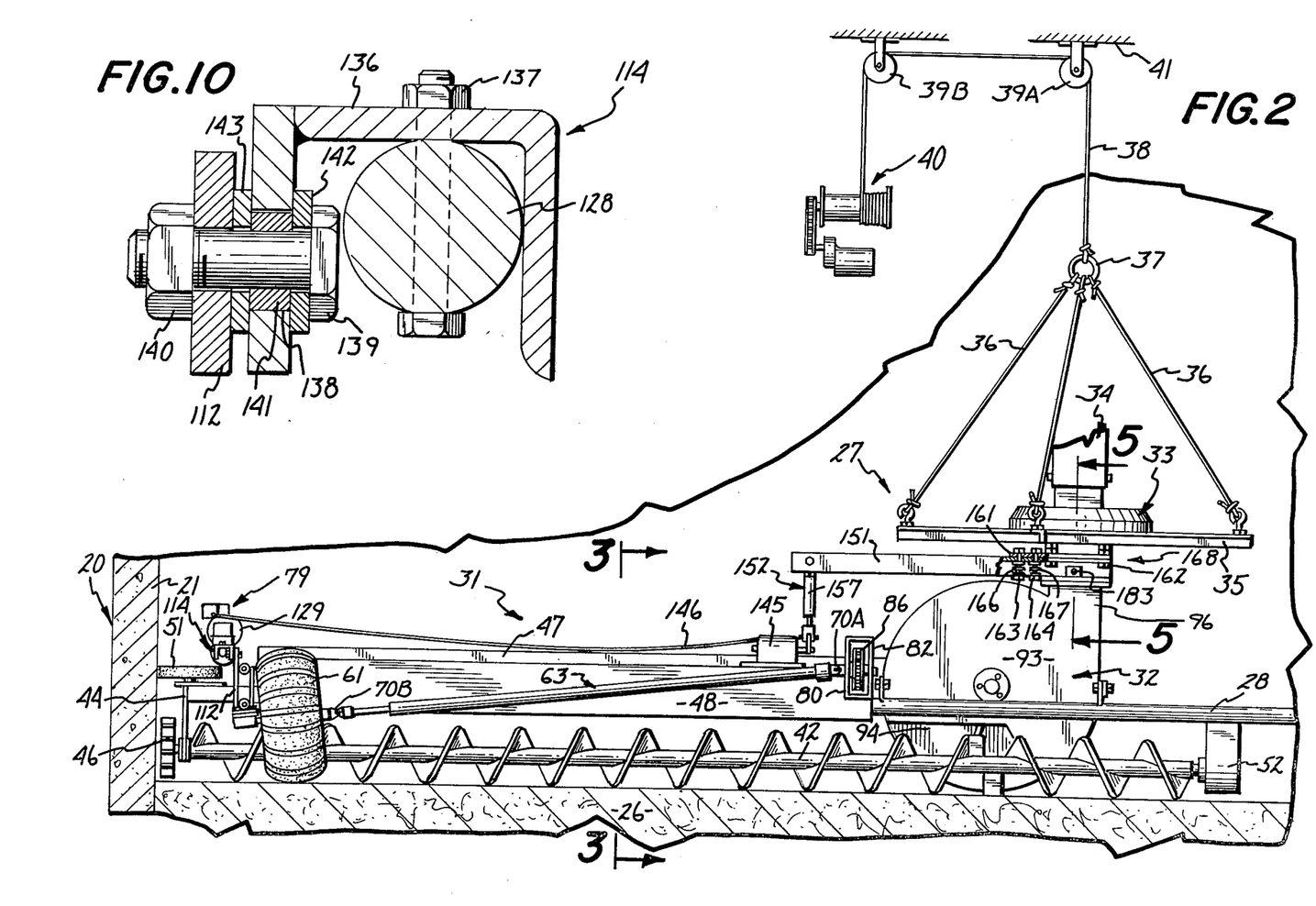
FIG. 2 is a sectional view taken along line 2—2 of FIG. 1 and a diagrammatic view of the unloader lifting winch.
FIG. 10 is a sectional view taken along line 10—10 of FIG. 9.

A triangular frame assembly indicated generally at 35 is attached to the lower side of the non-rotatable member of the slip ring assembly 33. Frame assembly 35 comprises three triangular members positioned about slip ring assembly 33. Each angle member has an outer end attached to cables 36. Three cables 36, as shown in FIG. 2, extend upwardly and are connected to a centering ring or member 37. A single cable 38 secured to ring 37 pendantly supports silo unloader 27 from a support 41 located on top of silo wall 21. A first pulley 39A attached to support 41 carries cable 38. Cable 38 extends from pulley 39A to a second pulley 39B down to a winch assembly indicated generally at 40. Winch assembly 40 can be secured to the outside of the base of silo 20. Winch assembly 40 is operable to raise the inner end of the silo unloader 27 above the surface of the material 26 whereby silo unloader 27 can be stored in a raised position. An example of winch assembly 40 is shown in U.S. Pat. No. 3,235,229. Support 41 can be the frame structure of the roof of the silo or a tripod mounted on top of silo wall 21. Examples of tripod structures are shown in U.S. Pat. Nos. 3,128,081 and 3,211,407.

Figures 3, 5:
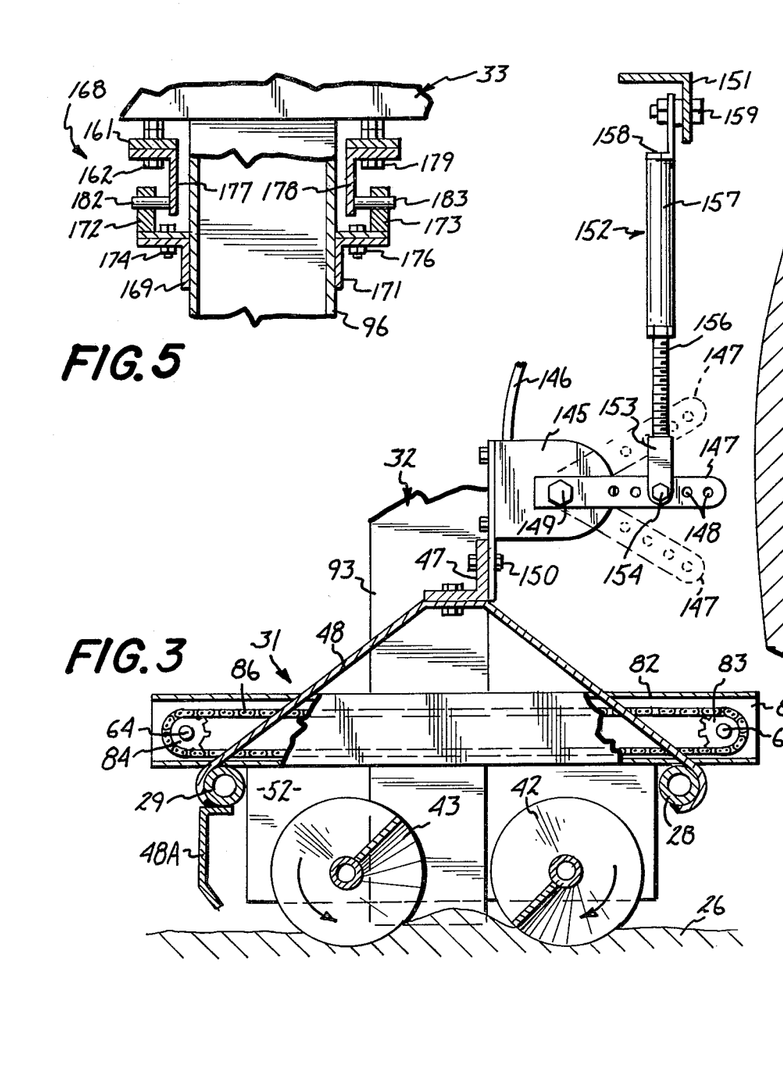
FIG. 3 is a sectional view taken along line 3—3 of FIG. 2.
FIG. 5 is an enlarged sectional view taken along line 5—5 of FIG. 2.
Figure 4:
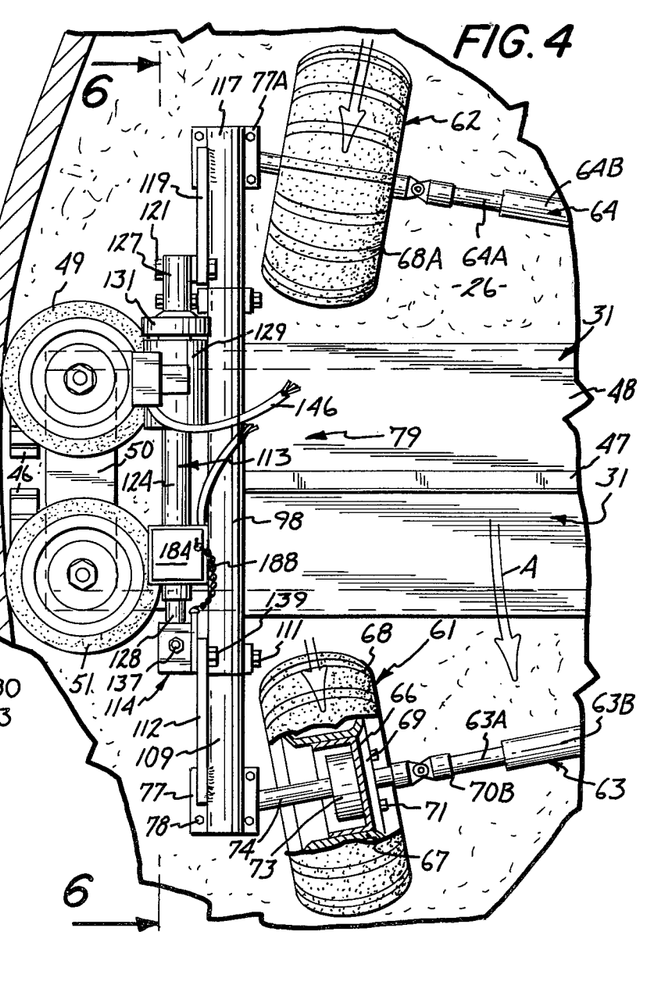
FIG. 4 is a plan view, partly sectioned, of the outer end of the collector of the silo unloader of FIG. 1.

As shown in FIGS. 2, 3, and 4, collector 31 has a horizontal leading auger 42 and a horizontal trailing auger 43 located between and below frame members 28 and 29. Augers 42 and 43 extend generally parallel to each other from approximately the center of the silo toward wall 21. The outer ends of augers 42 and 43 are rotatably mounted in a downwardly directed bracket 44 secured to the outer ends of frame members 28 and 29. Augers 42 and 43 can have different diameters and rotate at different speeds. An example of a differential speed auger arrangement is shown in U.S. Pat. No. 3,822,796.

A pair of wall cleaners 46 are secured to the outer ends of augers 42 and 43, respectively. Each wall cleaner 46 has a plurality of outwardly directed radial cutting members or knives. The knives may be detachable and reversible and are operable to cut and remove hard frozen material from the inside of wall 21. Wall cleaners 46 can be the wall cleaners disclosed in U.S. Pat. No. 3,651,960. Other types of wall cleaners can be attached to and rotate with the ends of augers 42 and 43.

A longitudinal center beam 47 is located over augers 42 and 43. The beam is mounted on the frame members 28 and 29. A cover 48 extends downwardly from beam 47 and over the outside of frame members 28 and 29. Cover 48 is secured to beam 47. A downwardly directed rear shield 48A, as shown in FIG. 3, is located rearwardly of trailing auger 43 and extends the length of collector 31.

A pair of wall engaging wheels 49 and 51 are rotatably mounted about separate upright axles attached to a horizontal plate 50. Plate 50 is secured to the outer ends of frame members 28 and 29. Wheels 49 and 51 are located in a generally horizontal plane and ride on the inside surface of wall 21 to space wall cleaners 46 a short distance from wall 21. When wheels 49 and 51 are in engagement with the inside surface of wall 21, collector 31 is in a position to gather material. Wall cleaners 46 are parallel to the upright wall 21 when collector 31 is in a generally level or horizontal position.

Augers 42 and 43 are rotated in opposite directions by power transmitted through a gear box 52. Gear box 52 is mounted on the inner end of frame members 28 and 29. An electric motor 53 operates to transmit power to gear box 52 and rotate impeller 32 through power transmission 54, shown as a belt and pulley drive. Other types of power transmissions can be used to operatively connect motor 53 to gear box 52 and impeller 32. An elongated shield 56 covers power transmission 54.

As shown in FIG. 1, an outwardly directed arm 57 is secured to the inner end of frame 28. Arm 57 is located approximately 90° in front of collector 31 and carries a forward guide wheel 58. A brace 59 secured to frame member 28 and the outer end of arm 57 stabilizes arm 57.

Collector 31 is driven around the silo wall 21 in the direction of arrow A with a pair of drive wheels 61 and 62. Drive wheels 61 and 62 are positioned adjacent the opposite sides of the outer end of the collector 31 and are located in driving engagement with the top surface of material 26. Drive wheels 61 and 62 are simultaneously rotated with power from electric motor 53 taken from gear box 52. A drive shaft assembly indicated generally at 63 transmits power to wheel 61. Drive shaft assembly 63 has telescoping drive members 63A and 63B operable to automatically extend the length of drive shaft assembly 63 as the wheel 61 moves up and down and around silo wall 21. A second drive shaft assembly 64 is drivably connected to wheel 62. Drive shaft assembly 64 has telescoping drive members 64A and 64B. Each drive shaft assembly 63 and 64 is secured to a pair of universal joints 70A and 70B allowing the turning radius of wheels 61 and 62 to be angularly adjusted.

Figures 6, 7, 8:
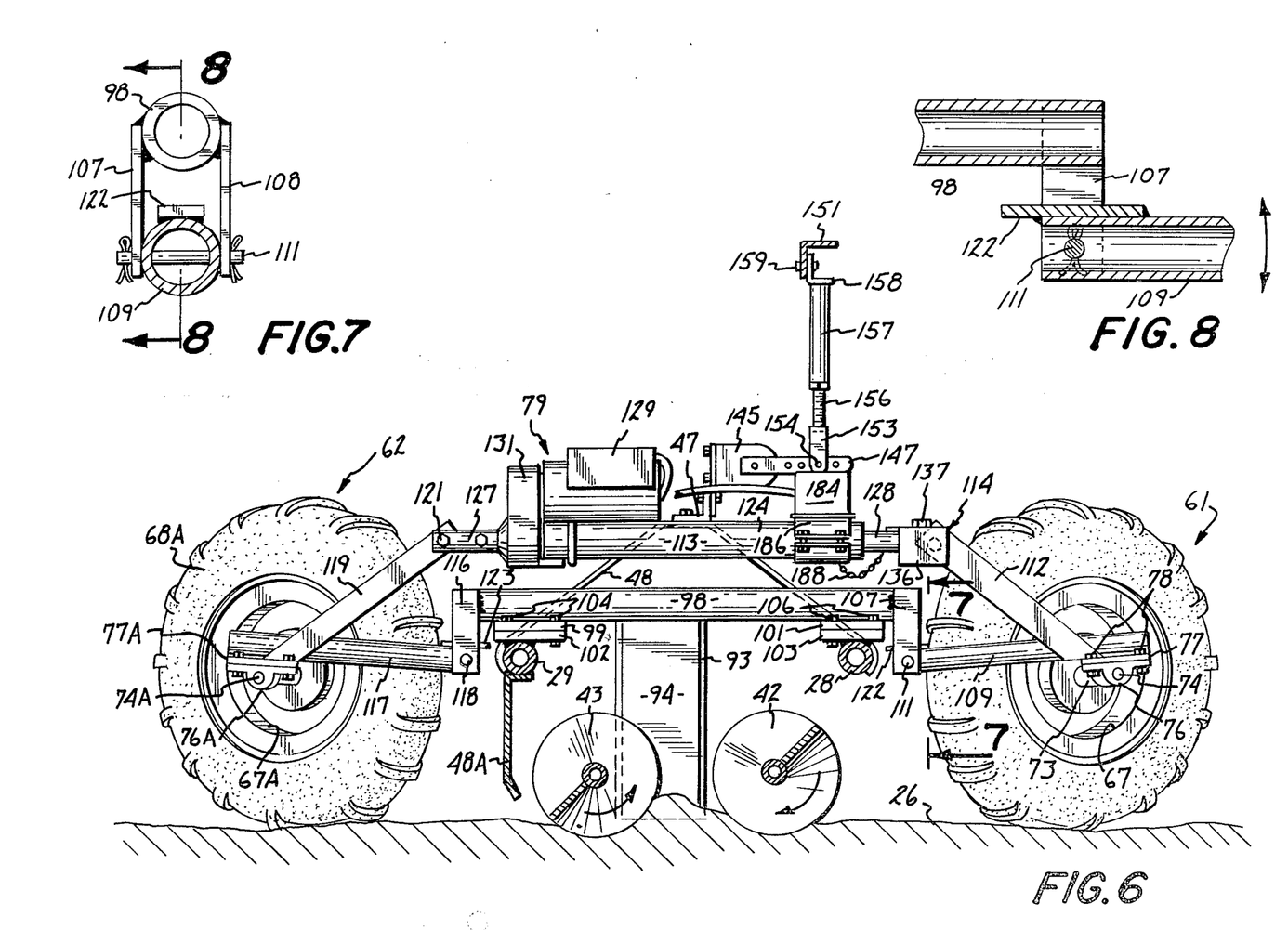
FIG. 6 is a sectional view taken along line 6—6 of FIG. 4.
FIG. 7 is a sectional view taken along line 7—7 of FIG. 6.
FIG. 8 is a sectional view taken along line 8—8 of FIG. 7.

Referring to FIG. 4, wheel 61 has a hub 66 carrying a rim 67. A disc or flange 69 is secured to universal joint 70B located on the outer end of drive shaft assembly 63. A plurality of bolts 71 secure discs 69 to hub 66 and a bearing unit 73. Bearing unit 73 is mounted on an axle 74. As shown in FIG. 6, axle 74 extends outwardly from wheel 61 and is mounted in a sleeve or bearing 76. Bearing 76 is secured to a plate 77 with a plurality of fasteners 78. Sleeve 76 has a number of holes for accommodating fasteners 78. The holes permit sleeve 76 to be located in a plurality of angular positions on the plate so that the turning radius of wheel 61 can be adjusted. The mounting structure for wheel 62 is identical to the wheel 61 and like parts have the same reference numerals with the suffix A.

When the turning radius of wheels 61 and 62 is greater than the radius of the curvature of silo wall 21, drive wheels 61 and 62 urge collector 31 toward wall 21 and maintain wheels 49 and 51 in engagement with the inside surface of wall 21. Plate 77 is connected to the forward end of a leveling means or linkage indicated generally at 79. Wheel 62 is connected to the rear end of leveling means 79 in a similar manner.

As shown in FIGS. 2 and 3, a cross member 80 extends across the mid-section of frame members 28 and 29 and is secured thereto by bolts (not shown). A generally L-shaped cover member 82 is located over cross member 80 and forms therewith a transverse passage for accommodating the drive structure connecting drive shafts 63 and 64. The drive structure includes a sprocket 83 mounted on shaft 63 and a sprocket 84 mounted on shaft 64. An endless roller link chain 86 connects sprockets 83 and 84 so that when power is applied to shaft 64 wheels 61 and 62 are simultaneously rotated to move collector 31 around silo wall 21. As shown in FIG. 1, drive shaft 64 is connected to a power shaft 87 with a suitably joint 88. Power shaft 87 is connected to an output drive shaft or gear box 89. The input drive of gear box 89 is connected to an output shaft of auger gear box 52. Upon operation of motor 53, power transmission 54 drives gear box 52. Gear box 52 rotates the augers 42 and 43 and applies power to gear box 89. The endless chain 86 transmits the power from shaft 64 to shaft 63 so that wheels 61 and 62 are driven in a clockwise direction as viewed in FIG. 6 at substantially the same rate of speed. Wheels 61 and 62 move collector 31 around the silo wall 21 in the direction of the arrow A, shown in FIGS. 1 and 4. The drive structure for wheels 61 and 62 is independent and isolated from the mounting structure for the wheels so that rotational torque applied to wheels 61 and 62 is independent of the leveling structure mounted on the outer end of collector 31. Also, the drive structure insures uniform weight and torque distribution on the outer end of collector 31.

Out chute 34 is maintained in radial alignment with doorway 22 by a torque arm 91. The inner end of torque arm 91 is pivotally connected to slip ring assembly 33. The outer end of torque arm 91 extends through doorway 22 and engages a portion of silo wall 21. An upright support member 92 secured to a mid-portion of torque arm 91 is pivotally connected to the top of out chute 34. Support member 92 maintains the out chute 34 in general vertical alignment with torque arm 91 and in general radial alignment with passageway 22.

Referring to FIG. 2, impeller 32 has a housing 93 having a lower inlet or entrance opening 94 for receiving the material from augers 42 and 43. As shown in FIG. 5, housing 93 has an upwardly directed tangential outlet neck 96 attached to the lower side of the slip ring assembly 33. Neck 96 has a generally square opening which forms a passage for directing the material through slip ring assembly 33 and out chute 34.

Referring to FIG. 1, a holder indicated generally at 94 is secured to housing 93 and frame members 28 and 29. Holder 94 is used with a lifting cable to elevate the entire unloader in silo 20. The details of holder 94 are disclosed in U.S. Pat. No. 4,132,450.

Referring to FIGS. 6-8, leveling means 79 has a transverse base 98 extended across the outer ends of frame members 28 and 29. Plates 99 and 101 are secured to the lower portions of opposite ends of base 98 and rest on pads 102 and 103 secured to the frame members 29 and 28, respectively. Plates 99 and 101 and pads 102 and 103 have aligned holes for accommodating fasteners 104 and 106, as nut and bolt assemblies, securing the plates to the pads.

A pair of downwardly directed flat ears 107 and 108 are secured to the right end of base 98 as viewed in FIG. 6. A first support 109 is pivotally connected to ears 107 and 108 with a transverse pivot pin 111. Mount or plate 77 is secured to the lower outer end of support 109 to support wheel 61. An upwardly and inwardly directed arm 112 is secured by welds or the like to the outer section of support 109. The upper inner end of arm 112 is pivotally connected to a linear actuator indicated generally at 113 with a lost motion connector or linkages 114. The opposite end of base 98 has downwardly directed ears 116 accommodating a second outwardly extending horizontal support 117. A transverse pivot pin 118 pivotally connects support 117 to ears 116. The outer end of support 117 is secured to mount or plate 77A which in turn carries sleeve 76A for the axle 74A of wheel 62. An upwardly and inwardly directed or inclined arm 119 is connected to linear actuator 113 with a transverse pivot pin 121. A short stop plate 122 is secured to the top of the inner portion of support 109. Stop plate 122 is located between the ears 107 and 108 and is adapted to engage the lower side of base 98 to determine the maximum elevated or raised position of collector 31. Support 117 has a similar stop plate 123 located between ears 116 and engageable with the other end of base 98. Stop plates 122 and 123 prevent wheels 61 and 62 from hitting augers 42 and 43 when collector 31 is raised from the top of the material in the silo.

Linear actuator 113, shown in FIGS. 4 and 6, is an electrical-mechanical apparatus that selectively extends and contracts in a linear direction. Actuator 113 has a cylindrical body or casing 124. A first rod 127 connects casing 124 to arm 119 with pivot pin 121. An actuator or second rod 128 extends linearly from casing 124. The outer end of second rod 128 is connected with lost motion connector 114 to arm 112. The reversible electric motor 129 is mounted on casing 124. Motor 129 can be a reversible hydraulic motor.

Referring to FIG. 4, linear actuator 113 has a gear drive 131 connected to the output drive shaft of a reversible electric motor 129. Gear drive 131 is secured to a longitudinal screw (not shown) located in longitudinal alignment with actuator 128. A collar (not shown) having a plurality of helical grooves and carrying ball bearings operatively joins the screw to actuator 128. Upon rotation of the screw by operation of gear drive 131, the ball bearings move in an endless helical path and convert rotary motion of the screw to a linear motion of actuator 128. The drive train from gear drive 131 is through a clutch (not shown). The screw, collar, and clutch are disclosed in U.S. Pat. No. 4,170,385. The clutch is an overload clutch which allows motor 129 to operate at the end of the stroke or when a preset load limit is encountered. The clutch can be a ball detent-type clutch. Gear drive 131 prevents extension and contraction of actuator 128 when motor 129 is not operated. In other words, gear drive 131 holds the actuator in a fixed adjusted position when the power is terminated, i.e., when motor 129 is energized. The entire linear actuator 113 is a rigid link thereby holding collector 31 in an adjusted selected operating position.

Figure 9:
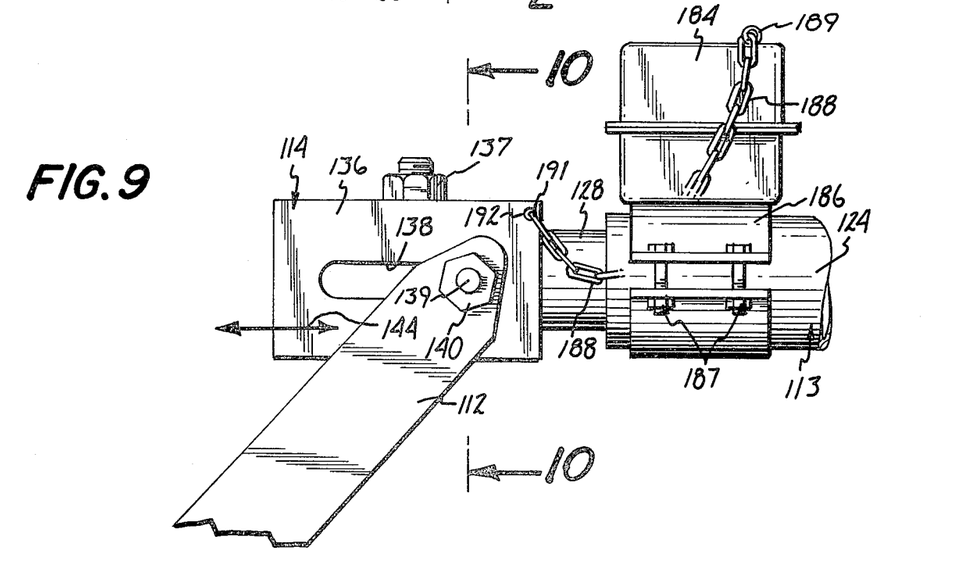
FIG. 9 is an enlarged side view of the lost motion control connected to the linear actuator.
Figures 11, 14:
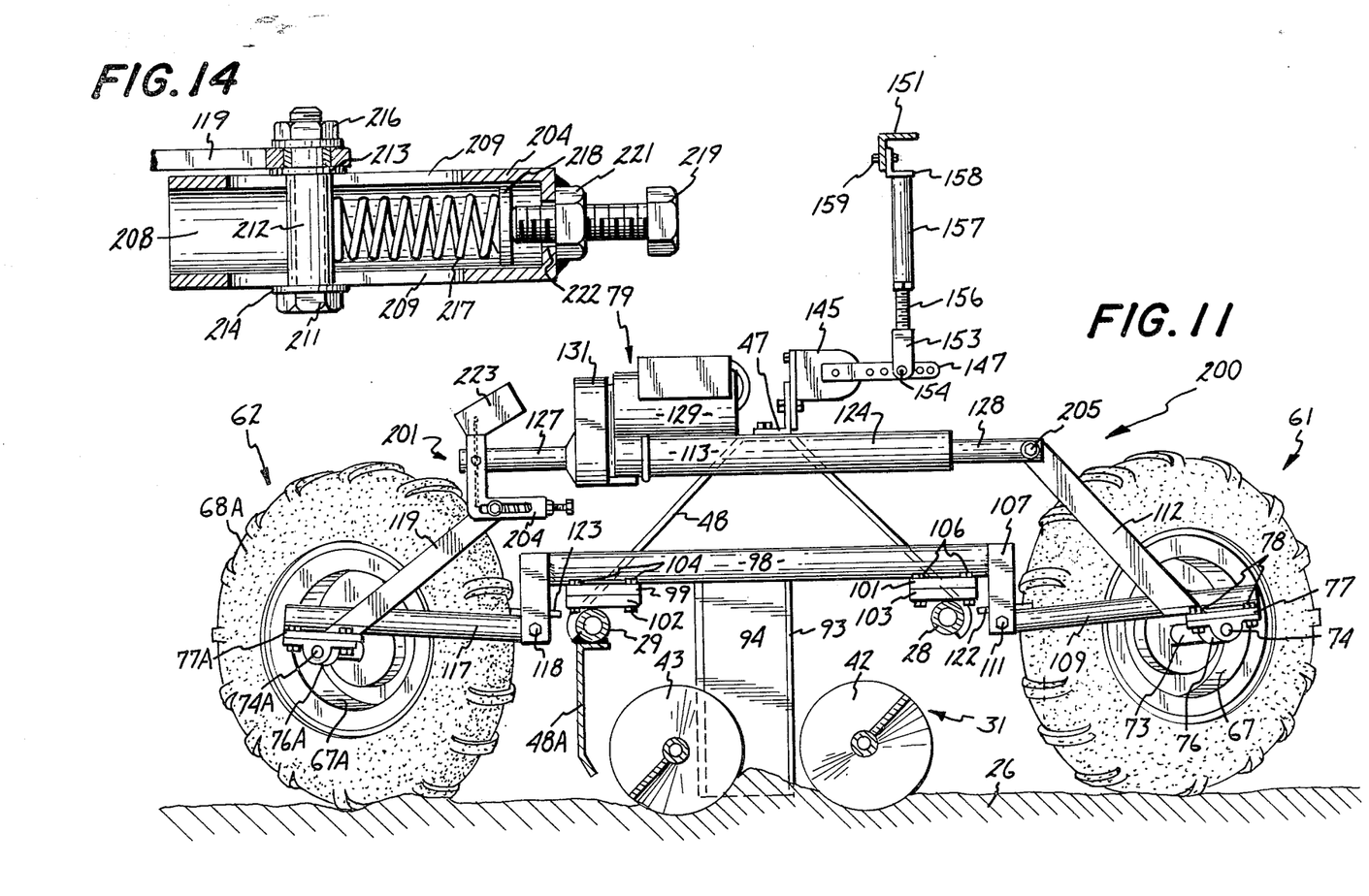
FIG. 11 is a sectional view similar to FIG. 6 of a modification of the collector leveling apparatus and lost motion control of the invention.
FIG. 14 is a sectional view taken along line 14—14 of FIG. 12.

Referring to FIGS. 9 and 10, lost motion connector 114 comprises an inverted U-shaped member 136. A nut and bolt assembly 137 connects second rod 128 to the top of member 136. The inside or side of member 136 facing the center of the silo has an elongated linear slot 138 accommodating a pivot bolt 139 connecting arm 112 to member 136. As shown in FIG. 10, a sleeve or bushing 141 surrounding bolt 139 is located in slot 138. Washers 142 and 143 located on opposite sides of bushing 141 retain bolt 139 on member 136 and allow bolt 139 to move along slot 138. A nut 140 threaded on bolt 139 holds arm 112 in assembled relation with bolt 139 adjacent washer 143. The pivotal connection of bolt 139 allows arm 112 to move linearly in slot 138 in the direction of arrow 144, shown in FIG. 9. The lost motion connection provided by slot 138 allows linear actuator 113 to contract a limited amount without moving wheels 61 and 62 up or down.

Motor 129 is a reversible electric motor controlled by a motor control unit or controller 145. An electric cable or line 146 connects controller 145 with motor 129. As shown in FIG. 3, bolts 150 secure controller 145 to the center top beam 47 of collector 31. Controller 145 has a movable actuator arm 147 having a plurality of holes 148 connected to controller shaft 149. Controller 145 is a reversing switch controlled by the position of arm 147. The switch is a two on position switch with a dead center or position center off position between the two on positions. Arm 147 is normally located in the center off position and can only be moved to one on position at a time. In other words, the two on positions of the switch cannot be attained at the same time. When arm 147 is in the horizontal position, as shown in full lines in FIG. 3, controller 145 is in the center off or neutral position. Arm 147 is moved to the up first on position when collector 31 falls below its selected operating position. When arm 147 moves to its down second on position, collector 31 has raised or moved to an up position above its selected operating position. Controller 145 functions to control the reversible electrical motor 129 to automatically actuate linear actuator 113 whereby collector 31 is returned to its selected operating position. Controller 145 can also be a hydraulic valving structure operable to control a reversible hydraulic motor used to drive linear actuator 113. A hydraulic or pneumatic piston and cylinder assembly can be used in lieu of linear actuator 113. A reversing valve can be used to selectively extend or contract the piston and cylinder assembly.

Arm 147 is connected to a horizontally fixed reference arm 151 with an adjustable length link 152. Link 152 has a bottom clevis 153 connected with a pin 154 to arm 147. Pin 154 can be selectively positioned in any one of holes 148 controlling the amount of angular up-and-down movement of arm 147. The closer pivot pin 154 is to the pivot or axis of movement of arm 147, the more sensitive the switch is to up and down movement of collector 31. Link 152 has a threaded rod 156 threaded into an upright sleeve 157. The rotation of rod 156 adjusts length of link 152. A member 158 is secured to the upper end of sleeve 157. A pivot bolt 159 connects angle member 158 to the outer end of arm 151. The length of link 152 can be adjusted to change the selected operating position of collector 31. Collector 31 can be located in its normal or selected operating position at an angle leading toward or leading away from silo wall 21. The selected position can be in a horizontal level plane.

Referring to FIG. 2, arm 151 is connected to the rotatable member of slip ring assembly 33 with a short plate 161. Bolts 162 secure plate 161 to the bottom side of slip ring assembly 33. A pair of nut and bolt assemblies 163 and 164 having coil springs 166 and 167 yieldably hold arm 151 in flat engagement with the bottom of plate 161. Springs 166 and 167 bias arm 151 in an upward direction and allow arm 151 to be moved away from plate 161. Arm 151 can be moved downwardly and upwardly against biasing force of springs 166 and 167.

A hinge assembly indicated generally at 168 pivotally connects impeller 32 to the rotatable member of slip ring assembly 33. As shown in FIG. 5, hinge assembly 168 is mounted on a pair of angle supports 169 and 171 secured to opposite sides of neck 96. Hinge assembly 168 has a first pair of members 172 and 173 attached to supports 169 and 171 with nut and bolt assemblies 174 and 176. A second pair of members 177 and 178 are attached to slip ring assembly 33 with nut and bolt assemblies 162 and 179. Pivot pins 182 and 183 pivotally connect members 172 and 173 with members 177 and 178 whereby collector 31 angularly moves or pivots about the horizontal axis of pins 182 and 183. Arm 151 provides a constant reference structure for collector 31. Up and down movement of collector 31 results in actuation of motor controller 145. Controller 145 regulates the electric power supplied to motor 129.

Referring to FIGS. 4, 6, and 9, a limit switch unit 184 is mounted on casing 124 of linear actuator 113 with a bracket 186. A plurality of nut and bolt assemblies 187 clamp bracket 186 to casing 124. An elongated flexible line or chain 188 connects limit switch actuator 189 to lost motion connector 114. One end of chain 118 is connected to actuator 189. The opposite end of chain 188 is attached to an S hook 191 located in a hole 192 in lost motion connector 114. Limit switch 184 is connected in series with linear actuator motor 129. When linear actuator 113 becomes substantially extended chain 188 will become taut and actuate the limit switch 184 which, in turn, interrupts the circuit to motor 129. Limit switch 184, in conjunction with the length of chain 188, determines the elongated or extended position of linear actuator 113. This prevents use of the override clutch, except upon failure of the limit switch. Frequent use of the override clutch results in excessive wear to it.

In use, winch assembly 40 operates to lower unloader 27 into engagement with the top surface of material 26 stored in silo 20. Augers 42 and 43 are positioned in operative surface engagement with the top of material 26. Drive wheels 61 and 62 are located in driving engagement with the material adjacent silo wall 21. Wall engaging wheels 49 and 51 are positioned in engagement with the inside surface of wall 21.

Motor control unit 145 operates electric motor 129 of linear actuator 113 if the outer end of collector 31 is not in its selected operating position. Linear actuator 113 will either extend or contract to relocate the outer end of collector 31 to its selected operating position. When linear actuator 113 contracts the wheels 61 and 62 are pivoted in an upward direction so that the augers will be lowered into material 26. When augers 42 and 43, or one auger, engage hard material, as a frozen section of material, augers 42 and 43 will ride on top of the hard material. Linear actuator 113 operates to further contract. Lost motion connector 114, with its elongated slot 138, allows additional contraction of linear actuator 113 without raising wheels 61 and 62 off the surface of the silage and thereby losing traction. As shown in FIG. 9, lost motion connector 114 moves in the direction of arrow 144 without moving bolt 139 located in slot 138. This additional motion is normally sufficient to cause motor 129 of linear actuator 113 to deenergize.

Motor 53 of unloader 27 operates to drive the rotor of impeller 32 and gear box 52. This rotates augers 42 and 43 and applies driving power to wheels 61 and 62. Collector 31 is moved in a circular path, as indicated by arrow A in FIG. 1, by the driving action of wheels 61 and 62.

The inner end of unloader 27 is pendantly supported by cable 38 from a top support, as a tripod, mounted on the top of silo wall 21. Slip ring assembly 33 held by the cable 38 in a reference position also holds reference arm 151 in a reference position. Reference arm 151 is connected to the rotatable portion of slip ring assembly 33 so that it moves around the silo along with collector 31. When collector 31 engages a hard area of the material or an elevated portion of the material 26, wheels 61 and 62 riding on the hard material will move the collector to an up or raised position. Arm 147 of motor control unit 145 moves from the center off position to a down on position, as shown in broken lines in FIG. 3. Motor control unit 145 supplies electric power to electric motor 129 thereby driving motor 129 in a first direction contracting linear actuator 113. This causes the outer end of collector 31 to move down to its selected operating position. When collector 31 returns to its selected operating position, arm 147 returns to its center off or neutral position, as shown in full lines in FIG. 3. This terminates the electric power to motor 129.

In the event that wheels 61 and 62 sink into material 26, collector 31 moves down below its selected operating position. Actuator arm 147 of motor control unit 145 will raise or move to its up position. This causes motor control unit 145 to supply power to reversible electric motor 129 thereby operating motor 129 in a second direction. Linear actuator 131 elongates thereby moving the outer end of collector 31 up. Bolt pin 139 will be located in the inner or right end of slot 38, as viewed in FIG. 9, when linear actuator 113 is elongated. The result is that the outer end of collector 31 will be elevated or raised until collector 31 is in the selected operating position.

The operation of the linear actuator 113 automatically continues during the movement of collector 31 in the direction of the arrow A around the silo wall. This action automatically maintains the outer end of collector 31 in a selected operating position. The lost motion connector 114 allows linear actuator 113 to have a limited independent contraction movement to allow augers 42 and 43 to dig into the hard portions of the material 26 without raising the wheels out of traction engagement with material 26.

When sufficient material 26 has been removed from the silo, winch assembly 40 is actuated to raise silo unloader 27 to elevate augers 42 and 43 above the top surface of material 26. Motor control unit 145 functions to actuate the electric motor 129 whereby the outer end of the unloader 31 is held in an elevated position by wheels 61 and 62. The augers 42 and 43 and rotor of the impeller continue to rotate until silo unloader 27 is cleaned of material.

Referring to FIGS. 11-14, there is shown a modification of the leveling apparatus of the invention indicated generally at 200 on the outer end of the silo unloader collector 31. The silo unloader structure that is identical to the structure shown in FIGS. 1-10 has the same reference numeral.

Figures 12, 13:
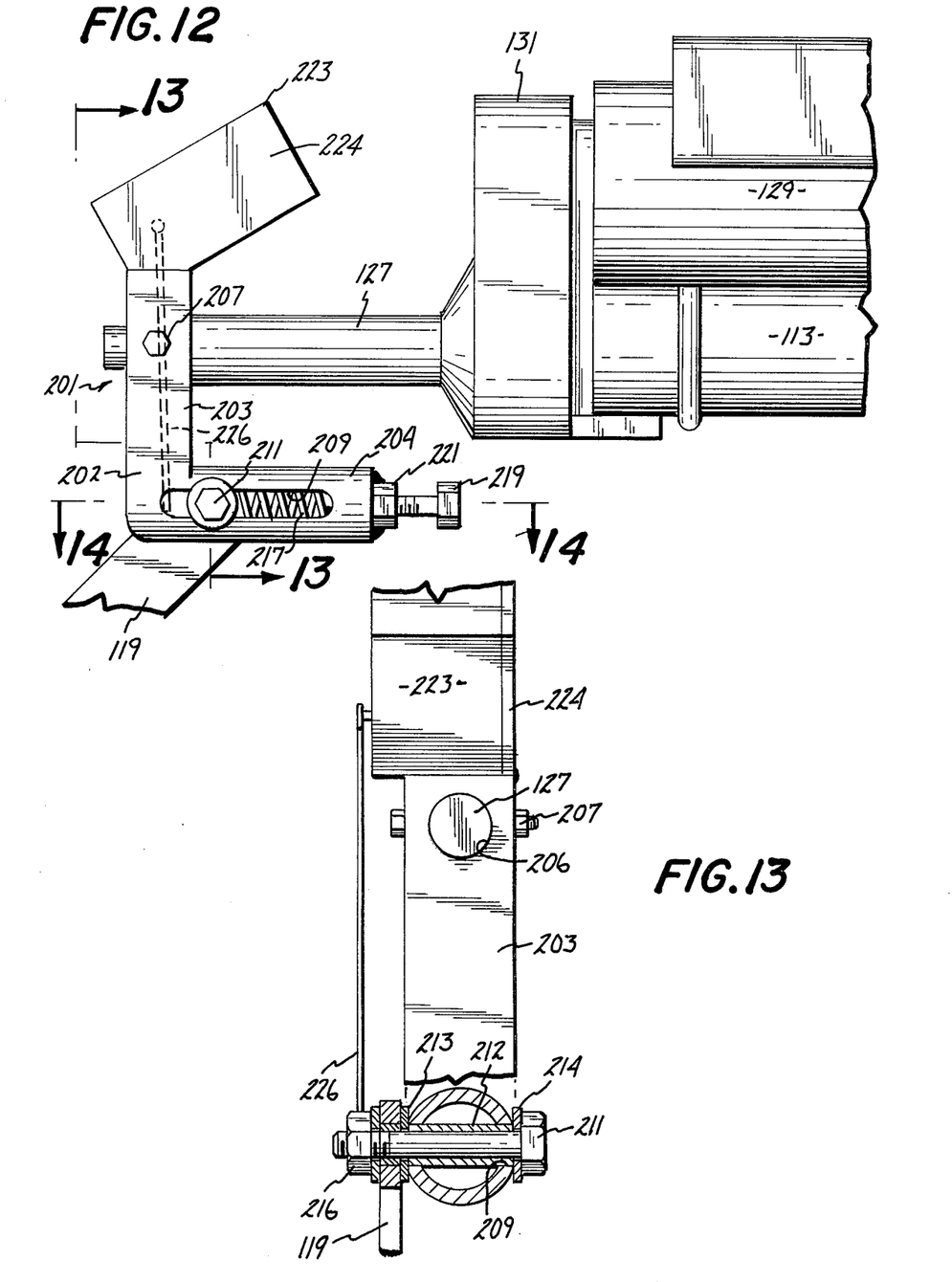
FIG. 12 is an enlarged side view of the lost motion control connected to the linear actuator of FIG. 11.
FIG. 13 is an enlarged sectional view taken along line 13—13 of FIG. 12.

Leveling apparatus 200 has a lost motion connection 201 that includes biasing means associated with the lost motion connection structure to urge wheels 61 and 62 into driving or traction engagement with the top surface of material 26. Lost motion connection 201 has a link or L-shaped member 202 comprising a first or upright section 203 and a second or horizontal section 204. As shown in FIG. 12, the upper end of section 203 has a hole accommodating the end of linear actuator rod 127. A transverse bolt 207 extends through suitable holes in section 203 and rod 127 to connect rod 127 to section 203. Lost motion connection 201 is located at the left end of linear actuator 113, as viewed in FIG. 11. The most motion connector 114 of FIG. 6 is at the opposite or right end of linear actuator 113.

Referring to FIG. 13, second section 204 has a longitudinal bore 208 and a pair of longitudinal side slots 209 open to bore 208. A transverse pin 211 extends through bore 208 and slot 209. The upper end of arm 119 is pivotally connected to pin 211. A sleeve or bushing 212 surrounding pin 211 provides a bearing for pin 211 to facilitate the longitudinal movement of pin 211 along slots 209. Bushing 212 is held in transverse alignment with slot 209 with a pair of washers 213 and 214 which also retain pin 211 on section 204. A nut 216 holds arm 119 on pin 211.

A compression coil spring 217 is interposed between pin 211 and a disc 218 in bore 208. An adjusting bolt 219 bears against disc 218 to adjust the compression of spring 217. Bolt 219 is threaded through a nut 221 secured by welds or the like to the end of section 204. Bolt 219 extends through a hole 222 aligned with nut 221 so that the forward end of bolt 219 bears against the disc 218.

As shown in FIGS. 12 and 13, a limit switch 223 is mounted with a bracket 224 on top of section 203. Limit switch 223 is connected in controlling relationship, as in series connection, with motor 129. It has a normally closed position completing a circuit to motor 129. Limit switch 223 has a downwardly directed actuator finger 226 having a lower end located in alignment with the nut 216. When the nut 216 is at its outer limit, or at the left end of slots 209 in FIGS. 12 and 14, it will engage actuator finger 226 thereby actuating limit switch 223. This will interrupt the electric circuit to motor 129 thereby terminating the contraction of linear actuator 113.

In use, the weight of the outer end of the collector 31 will tend to move pin 211 against the pressure of spring 217. As the weight of outer end of collector 31 begins to be removed from wheels 61 and 62, spring 217 will move pin 211 to the left or elongated position of slots 209. The left portion of slots 209 provides a lost motion connection between linear actuator 113 and the arm 119 so that the spring 217 will bias the wheels in a downward direction to maintain the wheels in drivng engagement with the surface of material 26. The amount of the lost motion between the slots 209 and pin 211 is determined by the pressure of spring 217. The lost motion connection 201 operates to limit the action of linear actuator 113 so that drive wheels 61 and 62 do not lose traction when augers 42 and 43 ride on a hard section of material 26. When wheels 61 and 62 start to lose the traction, the weight of the outer end of collector 31 is partially removed from wheels 61 and 62 and pin 211 moves in slots 209. Limit switch 223 breaks the circuit to drive actuator motor 129 so that collector 31 will continue to be driven around the silo. As soon as augers 42 and 43 ride over the hard portions of material 26, the pin 211 will move to the right away from actuator finger 226 thereby closing the electrical circuit to the linear actuator motor 129. The linear actuator 113 will then continue to operate to maintain the collector 31 at its selected operating position.

While there has been shown and described two embodiments of the leveling and drive structure for a top unloading silo unloader, it is understood that other types of silo unloaders, including silo unloaders having a single auger or an endless chain collector, can be equipped with the leveling and drive structure of the invention. Other types of linear actuators and lost motion connectors can be used to change the relative positions of drive wheels 61 and 62 and collector 31. Also, a single drive wheel can be used in lieu of double drive wheels to move collector 31 around the silo wall. The invention is defined in the following claims.

The embodiments of the invention in which an exclusive property or privilege is claimed are defined as follows:

1. A drive and leveling structure and control therefor for a top unloading silo unloader including a material collector comprising: a base mountable on the outer end of the collector, a first support movably connected to the base for generally upward and downward movement, a first drive wheel located adjacent for forward side of the collector, a first mount connecting the first wheel to the first support, a second support movably connected to the base for generally upward and downward movement, a second drive wheel located adjacent the trailing side of the collector, a second mount connecting the second wheel to the second support, a first arm secured to the first support, a second arm secured to the second support, linear extendible and contractable means operable to pivot the supports and hold the supports in selected positions to maintain the outer end of the collector in a selected operating position, first means connecting the linear extendible and contractable means to the first arm, second means connecting the linear extendible and contractable means to the second arm, one of said first and second means having a lost motion means allowing the linear extendible and contractable means to contract a limited amount without pivoting the wheels when the collector is supported on material in the silo, said lost motion means including a member having an elongated slot connected to the linear extendible and contractable means, pivot means located in said slot connecting the second arm to the member, biasing means cooperating with the member and pivot means to urge the wheels into engagement with the material, means for rotating the first and second wheels, a control unit mounted on the collector for controlling said linear extendible and contractable means, a reference arm adapted to be held in a fixed reference position, means connecting the reference arm to the control unit whereby relative movement between the reference arm and control unit operates the control unit which causes a change in the effective length of the linear extendible and contractable means thereby changing the elevation of the outer end of the collector means.

2. The apparatus of claim 1 wherein: sand control unit includes movable means connected to the means connecting the reference arm to the control unit, said movable means being selectively locatable in a center off position, an up on position, and a down on position whereby when said outer end of the collector moves to a down position below the selected operating position, the movable means moves to the up on position operating the motor in the second direction to extend said linear extendible and contractable means thereby raising the outer end of the collector to the selected operating position, and when said outer end of the collector moves to a position above the selected operating position, the movable means moves to the down on position operating the motor in the first direction to contract said linear extendible and contractable means thereby allowing the collector to move to the selected operating position.

3. The structure of claim 1 including: means for adjusting the biasing force of the biasing means.

4. The structure wherein: the base has a member having a first end and a second end, a first pair of downwardly directed ears secured to the first end, first pivot means pivotally connecting the first support to the first pair of ears, a second pair of downwardly directed ears secured to the second end, second pivot means pivotally connecting the second support to the second pair of ears, said first and second pivot means having axes extended transversely of the longitudinal extension of the base.

5. The structure of claim 1 wherein: the member has a first section attached to the linear extendible and contractable means and a second section having the slot and accommodating the pivot means.

6. The structure of claim 5 wherein: the second section has a longitudinal bore open to the slot, and said biasing means being located in the bore urging the pivot means in a direction to move the wheels into engagement with the material.

7. The structure of claim 6 including: means mounted on the second section for adjusting the biasing force of the biasing means.

8. The structure of claim 1 wherein: the linear extendible and contractable means includes a reversible electric motor operable in a first direction to contract said linear extendible and contractable means and operable in a second direction to extend said linear extendible and contractable means, said control unit connected to said electric motor to selectively control the operation of the electric motor and limit switch means cooperating with the linear extendible and contractable means to break the electric circuit to the motor when the linear extendible and contractable means is in its substantially full extended position.

9. The structure of claim 1 wherein: the linear extendible and contractable means includes a reversible electric motor means operable to selectively contract and extend the linear extendible and contractable means, and switch means connected in controlling relationship with said motor means, said switch means having actuator means adapted to operably engage the pivot means on operation of said linear extendible and contractable means and movement of said pivot means to the extended end position in the slot.

10. The structure of claim 1 wherein: the means for rotatably the first and second wheels includes power transmission means adapted to be mounted on the collector, and separate drive shafts connecting the power transmission means to the first and second drive wheels.

11. A leveling structure and control therefor for a top unloading silo unloader including a material collector having an outer end comprising: a base adapted to be mounted on the outer end of the collector, a first support movably connected to the base for generally upward and downward movement, a first wheel located adjacent the forward side of the collector, a first mount connecting the first wheel to the first support, a second supply movably connected to the base for generally upward and downward movement, a second wheel located adjacent the trailing side of the collector, a second mount connecting the second wheel to the second support, linear extendible and contractable means operable to pivot the supports and hold the supports in selected positions to maintain the outer end of the collector in a selected operating position, first means connecting the linear extendible and contractable means to the first support, second means connecting the linear extendible and contractable means to the second support, one of said first and second means having lost motion means allowing the linear extendible and contractable means to extend or contract a limited amount without moving the wheels, said lost motion means including a member having first means extended in the linear direction of the movement of the linear extendible and contractable means and second means cooperating with the first means to allow said limited movement of the extendible and contractable means without moving the wheels, control means mounted on the collector for controlling said linear extendible and contractable means, a reference arm adapted to be held in a fixed reference position, means connecting the reference arm to the control means whereby relative movement between the reference arm and control means operates the control means which causes a change in the effective length of the linear extendible and contractable means thereby changing the elevation of the outer end of the collector.

12. The structure of claim 11 wherein: the first means of the lost motion means includes a member having an elongated slot and the second means includes pivot means located in said slot.

13. A leveling structure and control therefor for a top unloading silo unloader including a material collector having an outer end comprising: a base adapted to be mounted on the outer end of the collector, a first support movably connected to the base for generally up and down movement, a first wheel located adjacent the forward side of the collector, a first mount connecting the first wheel to the first support, a second support movably connected to the base for generally up and down movement, a second wheel located adjacent the trialing side of the collector, a second mount connecting the second wheel to the second support, linear extendible and contractable means operable to pivot the supports and hold the supports in selected positions to maintain the outer end of the collector in a selected operating position, first means connecting the linear extendible and contractable means to the first support, second means connecting the linear extendible and contractable means to the second support, one of said first and second means having lost motion means allowing the linear extendible and contractable means to extend or contract a limited amount without moving the wheels, said lost motion means including a member having an elongated slot, pivot means located in said slot, pivotally connecting the one support to the member, biasing means cooperating with the member and pivot means to urge the wheels into engagement with the material, control means mounted on the collector for controlling said linear extendible and contractable means, a reference arm adapted to be held in a fixed reference position, means connecting the reference arm to the control means whereby relative movement between the reference arm and the control means operates the control means which causes a change in the effective length of the linear extendible and contractable means thereby changing the elevation of the outer end of the collector.

14. The structure of claim 13 including: means for adjusting the biasing force of the biasing means.

15. The structure of claim 13 wherein: the member has a first section attached to the linear extendible and contractable means and a second section having the slot and accommodating the pivot means.

16. The structure of claim 15 wherein: the second section has a longitudinal bore open to the slot, and said biasing means being located in the bore urging the pivot means in a direction to move the wheels into engagement with the material.

17. The structure of claim 16 including: means for adjusting the biasing force of the biasing means.

18. The structure of claim 13 wherein: the linear extendible and contractable means includes a reversible electric motor operable in a first direction to contract said linear extendible and contractable means and operable in a second direction to extend said linear extendible and contractable means, said control means being connected to said electric motor to selectively control the operation of the electric motor, and limit switch means cooperating with the linear extendible and contractable means to break the electrical circuit to the motor when the linear extendible and contractable means is in its full extended position.

19. A leveling structure and control therefor for a top unloading silo unloader including a material collector having an outer end comprising: a base adapted to be mounted on the outer end of the collector, a first support movably connected to the base for generally upward and downward movement, a first wheel located adjacent the forward side of the collector, a first mount connecting the first wheel to the first support, a second support movably connected to the base for generally upward and downward movement, a second wheel located adjacent the trailing side of the collector, a second mount connecting the second wheel to the second support, linear extendible and contractable means operable to pivot the supports and hold the supports in selected positions to maintain the outer end of the collector in a selected operating position, first means connecting the linear extendible and contractable means to the first support, second means connecting the linear extendible and contractable means to the second support, one of said first and second means having lost motion means allowing the linear extendible and contractable means to extend or contract a limited amount without moving the wheels, said linear extendible and contractable means including a reversible electric motor extendible and contractable means, said lost motion means including a member having an elongated slot, pivot means located in the slot connecting one of said arms to the member, and switch means connected in controlling relationship with said motor means, said switch means having actuator means adapted to operably engage the pivot means on operation of said linear extendible and contractable means and movement of said pivot means to the extended end position in the slot, said control means mounted on the collector.

20. The structure of claim 19 wherein: the means for rotating the first and second wheels includes power transmission means adapted to be mounted on the collector, and separate drive shafts connecting the power transmission means to the first and second wheels.

21. The structure of claim 20 wherein: the collector has a frame, said power transmission means being mounted on the frame remote and independent of the base and first and second supports connected to the base.

22. The structure of claim 19 wherein: the control means has a movable actuator arm selectively locatable in a center off position, an up on position, and a down on position, said means connecting the reference arm to the control means includes a link connected to the reference arm and the actuator arm whereby when said collector moves to a down position below the selected operating position, the actuator arm moves to the up on position operating the motor in the second direction to extend said linear extendible and contractable means thereby raising the collector to the selected operating position, and when said collector moves to a position above the selected operating position, the actuator arm moves to the down on position operating the motor in the first direction to contract said linear extendible and contractable means thereby allowing the collector to move down to the selected operating position.

23. A top unloading silo unloader for removing material stored in a tower silo having an upright wall and an open doorway comprising: first means movable around the silo wall for gathering material, second means moving the gathered material from the first means, said first means having an outer end locatable in a selected operating position, and an up position and a down position relative to the selected operating position, wheel means for supporting the outer end of the first means on the material, third means pendantly supportable in the silo for receiving material from the second means and directing the material to the open doorway, leveling means secured to the first means and wheel means for maintaining the outer end of the first means in the selected operating position, said leveling means including lost motion means operable to maintain the wheel means in engagement with the material, said lost motion means including a member having an elongated slot, means including pivot means located in said slot connecting the wheel means to said member whereby said member can move relative to said wheel means without moving the wheel means up or down, and biasing means cooperating with the member and pivot means to urge the wheel means in engagement with the material, control means mounted on the first means for controlling the leveling means, reference means mounted on the second means, means connecting the reference means to the control means whereby movement of the outer end of the first means to the down position actuates the control means to operate the leveling means to raise the outer end of the first means, and movement of the outer end of the first means to the up position actuates the control means to operate the leveling means to lower the outer end of the first means.

24. The structure of claim 23 including: means to drive said wheel means whereby said wheel means operates to move the first means around the silo wall.

25. The structure of claim 23 including: means for adjusting the biasing force to the biasing means.

26. The structure of claim 23 wherein: the leveling means includes a linear extendible and contractable means, said lost motion means being connected to a portion of the linear extendible and contractable means and the wheel means.

27. the structure of claim 26 wherein: the lost motion means includes a member having a first section and a second section having said slot accommodating said pivot means operatively connected to the linear extendible and contractable means and to the wheel means.

28. The structure of claim 27 wherein: the second section has a longitudinal bore open to the slot, and said biasing means being located in the bore urging the pivot means in a direction to move the wheel means into engagement with the material.

29. The structure of claim 28 including: means mounted on the second section for adjusting the biasing force to the biasing means.

30. The structure of claim 23 wherein: the leveling means includes a linear extendible and contractable means, said linear extendible and contractable means including a reversible electric motor operable in a first direction to contract said linear extendible and contractable means and operable in a second direction to extend said linear extendible and contractable means, said control means being connected to said electric motor to selectively control the operation of the electric motor, and limit switch means cooperating with the linear extendible and contractable means to break the electric circuit to the motor when the linear extendible and contractable means is in its substantially full extended position.

31. The structure of claim 23 wherein: the linear extendible and contractable means includes a reversible electric motor means operable to selectively contract and extend the linear extendible and contractable means and switch means connected in controlling relationship with said motor means, said switch means having actuator means adapted to operably engage the pivot means on operation of said linear extendible and contractable means and movement of said pivot means to the extended end position in the slot.

32. The structure of claim 23 wherein: said wheel means includes a pair of wheels located adjacent opposite sides of the first means, said leveling means being connected to said pair of wheels and power transmission means mounted on the first means remote from the wheels, and drive means connecting the power transmission means to the wheels whereby when power is applied to the power transmission means the wheels are rotated to move the first means around the silo wall.

33. A leveling control means for a top unloading silo unloader including a material collector having an outer end, and means for supporting the collector in a silo comprising: first means for sensing a change in a selected operating position of the collector, and second means mounted on the collector and connected to the means for supporting the collector in the silo for leveling the collector in the selected operating position in response to operation of the first means, said second means having lost motion means operable to maintain the means for supporting the collector in an operative position during the operation of the second means, said lost motion means including a member having an elongated slot, pivot means located in the slot, and biasing means cooperating with the member and pivot means to urge the means for supporting the collector to said operative position.

34. The structure of claim 33 including: means for adjusting the biasing force of the biasing means.

35. The structure of claim 33 wherein: the member has a first section, and a second section having the slot accommodating the pivot means.

36. The structure of claim 35 wherein: the second section has a longitudinal bore open to the slot, and said biasing means being located in the bore urging the pivot means in a direction to move the wheel means for supporting to said operative position.

37. The structure of claim 36 including: means mounting the second section for adjusting the biasing force of the biasing means.

38. The structure of claim 33 wherein: the second means includes a linear extendible and contractable means including a reversible electric motor operable in a first direction to contract said linear extendible and contractable means and operable in a second direction to extend said linear extendible and contractable means, and control means connected to said electric motor to selectively control the operation of the electric motor, and limit switch means cooperating with the linear extendible and contractable means to break the electrical circuit to the motor when the linear extendible and contractable means is in its substantially full extended position.

39. The structure of claim 33 wherein: the second means includes linear extendible and contractable means having a reversible electric motor means, said motor operable to selectively contract and extend the linear extendible and contractable means, and switch means connected in controlling relationship with said motor means, said switch means having actuator means adapted to operably engage the pivot means on operation of said linear extendible and contractable means and movement of said pivot means to the extended end position in the slot.

40. The structure of claim 33 wherein: the means for supporting the collector includes wheel means and power transmission means for rotating the wheel means.

41. The structure of claim 33 wherein: the means for supporting the collector in the silo includes drive wheel means located adjacent the collector, said second means being connected to the drive wheel means, and said lost motion means operable to maintain the drive wheel means in engagement with the material in the silo during the operation of the second means.

42. A leveling control means for a top unloading silo unloader including a material collector having an outer end comprising: vertically movable support means adapted to engage a supporting surface and positioned adjacent the outer end of the material collector, first means for sensing a change in a selected operating position of the collector, and second means mounted on the outer end of the collector and connected to the vertically movable support means for leveling the collector in the selected operating position in response to the operation of the first means, said second means having lost motion means operable to maintain the vertically movable support means in engagement with the material during the operation of the second means, said lost motion means including a member having an elongated slot, pivot means located in the slot, and biasing means cooperating with the member and pivot means to urge the vertically movable support means into engagement with the material.

43. The structure of claim 42 including: means for adjusting the biasing force of the biasing means.

44. The structure of claim 42 wherein: the member has a first section, and a second section having the slot accommodating the pivot means.

45. The structure of claim 44 wherein: the second section has a longitudinal bore open to the slot, and said biasing means being located in the bore urging the pivot means in a direction to move the vertically movable support means into engagement with the material.

46. The structure of claim 45 including: means mounted on the second section for adjusting the biasing force of the biasing means.

47. The structure of claim 42 wherein: the second means includes a linear extendible and contractable means including a reversible electric motor operable in a first direction to contract said linear extendible and contractable means and operable in a second direction to extend said linear extendible and contractable means, and control means connected to said electric motor to selectively control the operation of the electric motor, and limit switch means cooperating with the linear extendible and contractable means to break the electric circuit to the motor when the linear extendible and contractable means is in its substantially full extended position.

48. The structure of claim 42 wherein: the second means includes linear extendible and contractable means having a reversible electric motor means, said motor means operable to selectively contract and extend the linear extendible and contractable means, and switch connected in controlling relationship with said motor means, said switch means having an actuator means adapted to operably engage the pivot means on operation of said linear extendible and contractable means and movement of said pivot means to the extended end position of the slot.

49. The structure of claim 42 wherein: said vertically movable supporting means includes wheel means located adjacent the outer end of the collector.

* * * * *

UNITED STATES PATENT AND TRADEMARK OFFICE
CERTIFICATE OF CORRECTION

PATENT NO.  : 4,329,105
DATED       : May 11, 1982
INVENTOR(S) : Floyd E. Buschbom et al It is certified that error appears in the above-identified patent and that said Letters Patent is hereby corrected as shown below:

Column 6, line 3, "suitably" should be -- suitable --.

Column 7, line 43, "energized" should be -- deenergized --.

Column 9, line 11, "118" should be -- 188 --.

Column 10, line 62, "most" should be -- lost --.

Column 11, line 37, "drivng" should be -- driving --.

Column 12, Claim 1, line 6, delete "for" and insert -- the --.

Column 12, Claim 2, line 1, "sand" should be -- said --.

Column 13, Claim 10, line 2, "rotatably" should be -- rotating --

Column 13, Claim 11, line 9, "supply" should be -- support --.

Column 14, Claim 13, line 11, "trialing" should be -- trailing --

Signed and Sealed this

Twenty-fourth Day of April 1984

[SEAL]

Attest:

*Attesting Officer*

GERALD J. MOSSINGHOFF

*Commissioner of Patents and Trademarks*